(12) United States Patent
Sayre et al.

(10) Patent No.: US 12,325,648 B2
(45) Date of Patent: Jun. 10, 2025

(54) RECIRCULATING WATER SYSTEM COMPOSITION

(71) Applicant: BIO-LAB, INC., Lawrenceville, GA (US)

(72) Inventors: Curtis Sayre, Lawrenceville, GA (US); Jeffrey Gaulding, Lawrenceville, GA (US); Brian Trenck, Lawrenceville, GA (US); Al Yeoman, Lawrenceville, GA (US)

(73) Assignee: BIO-LAB, INC., Lawrenceville, GA (US)

( * ) Notice: Subject to any disclaimer, the term of this patent is extended or adjusted under 35 U.S.C. 154(b) by 530 days.

(21) Appl. No.: 17/636,828

(22) PCT Filed: Aug. 18, 2020

(86) PCT No.: PCT/US2020/046825
§ 371 (c)(1),
(2) Date: Feb. 18, 2022

(87) PCT Pub. No.: WO2021/041090
PCT Pub. Date: Mar. 4, 2021

(65) Prior Publication Data
US 2022/0298037 A1    Sep. 22, 2022

Related U.S. Application Data

(60) Provisional application No. 62/890,650, filed on Aug. 23, 2019.

(51) Int. Cl.
*C02F 1/68* (2023.01)
*C02F 1/76* (2023.01)
*C02F 103/42* (2006.01)

(52) U.S. Cl.
CPC ............... *C02F 1/688* (2013.01); *C02F 1/76* (2013.01); *C02F 2103/42* (2013.01); *C02F 2303/04* (2013.01)

(58) Field of Classification Search
CPC ........ C02F 1/688; C02F 1/76; C02F 2103/42; C02F 2303/04; C02F 1/5245; C02F 5/083; A01N 43/64; A01N 25/08; A01N 25/34; A01N 59/00

USPC .............. 210/755, 754, 748.2, 756; 252/175, 252/187.25, 187.23; 510/382; 424/409, 424/661, 489

See application file for complete search history.

(56) References Cited

U.S. PATENT DOCUMENTS

| | | | |
|---|---|---|---|
| 5,498,415 | A | 3/1996 | Jones |
| 6,447,722 | B1 * | 9/2002 | Rakestraw .............. B01F 21/22 252/186.25 |
| 6,863,830 | B1 | 3/2005 | Purdy et al. |
| 8,252,200 | B2 | 8/2012 | Lei et al. |
| 2017/0367326 | A1 | 12/2017 | Yeoman et al. |

FOREIGN PATENT DOCUMENTS

| EP | 3434104 A1 | 1/2019 |
|---|---|---|
| WO | 2013051013 A2 | 4/2023 |

OTHER PUBLICATIONS

International Search Report and Written Opinion of the International Searching Authority for International Patent Application No. PCT/US2020/046825 mailed Nov. 19, 2020, 7 pages.

Extended European Search Report for European Patent Application No. 20857739.5-1101 / 4017264 PCT/US2020/046825 Dated May 10, 2023, 6 pages.

* cited by examiner

*Primary Examiner* — Madeline Gonzalez
(74) *Attorney, Agent, or Firm* — Merchant & Gould P.C.; Daniel R. Evans

(57) ABSTRACT

Disclosed herein is a composition for the treatment of a recirculating water system, comprising: trichloro-s-triazentrione (TCCA) in an amount of from about 75% to about 98% by mass of the composition; an inorganic salt present in an amount of from about 2% to about 25% by mass of the composition; and an auxiliary agent in a total amount of from about 0% to about 10% by mass of the composition. Also disclosed herein is a formed object comprising the composition, a process for preparing the formed object, and a method of using the formed object.

20 Claims, No Drawings

RECIRCULATING WATER SYSTEM COMPOSITION

This application is a National Stage Application of PCT/US2020/046825, filed on Aug. 18, 2020, which claims priority to U.S. Provisional Patent Application No. 62/890,650, filed Aug. 23, 2019, the disclosures of which are hereby incorporated by reference herein in their entireties. To the extent appropriate, a claim of priority is made to each of the above disclosed applications.

SUMMARY

Disclosed herein is a composition for the treatment of a recirculating water system, comprising: trichloro-s-triazentrione (TCCA) in an amount of from about 75% to about 98% by mass of the composition; an inorganic salt present in an amount of from about 2% to about 25% by mass of the composition; and an auxiliary agent in a total amount of from about 0% to about 10% by mass of the composition. Also disclosed herein is a formed object comprising the composition, a process for preparing the formed object, and a method of using the formed object.

BACKGROUND

Maintenance of a recirculating water system (e.g., a swimming pool or a spa), requires regular addition of a sanitizer to limit pathogen growth. Sanitizing tablets, such as those of trichloro-s-triazentrione (trichlor or TCCA), have long been used as a convenient means to introduce chemical sanitizers, with a slow dissolution rate such that there is extended delivery of the sanitizer over time, in order to ensure that an effective level is maintained in the water.

It is desirable to maintain a chlorine residual in a recirculating water system such that chlorine is available to sanitize upon introduction of undesirable micro-organisms. High levels of residual chlorine, however, may create environments which are unsafe (e.g., for swimming use). The U.S. Environmental Protection Agency regulations for a pool containing chlorine as the active sanitizer dictate that the range in the pool be maintained between 1-4 ppm of free available chlorine when swimmers are present. The characteristic dissolution behavior of a typical TCCA tablet (non-formulated, ~99% trichloro-s-triazenetrione) is driven by the surface area of the tablet exposed to the water. As such, the delivery of free chlorine is not uniform. For example, the first 25-50% of the tablet dissolves at a faster rate than the latter portion of the tablet. Consequently, the characteristic peak and tailing pattern of chlorine introduction may be less than optimal if the peak dissolution rate causes the free chlorine to exceed the 4 ppm limit.

The shape of a tablet may be altered to change the surface area of the tablet and therefore adjust the overall dissolution profile. For example, a spherical tablet would have the lowest surface area to volume ratio for a given mass of TCCA to be introduced into the pool. However, there are practical constraints with regard to consumer handling, manufacturing, and transport that must also be considered. A commonly used 8 oz. tablet (or "puck") format is substantially cylindrical with a height of about 1" and a diameter of about 3", typically with beveled edges. This shape is robust for manufacture and transport, easy to handle, and has been a long-term industry standard such that it is compatible with the majority of pool operation and maintenance equipment. It is also relatively efficient from a surface to volume ratio, and the large flat faces allow easy stacking which can be tailored to meet the needs of a specific pool installation. Therefore, there is little advantage to be gained from modifying the tablet shape.

While reducing the overall mass of a tablet while maintaining the tablet diameter and TCCA composition would serve to reduce the peak chlorine release, it would also reduce the overall longevity of the tablet, necessitating more frequent replacement by consumers and increasing the possibility of a chlorine residual that has fallen out of the effective range.

Another approach is to formulate a tablet such that an inert component replaces some of the TCCA and modifies the dissolution profile of the tablet. Including a component of the formulation with lower solubility within the tablet would be expected to reduce the surface area of TCCA exposed to the water, and as such extend the time required for the full tablet to dissolve. The disadvantage of heavy reliance on poorly soluble materials for dissolution control are that 1) a dissolving tablet is not as reliable at visually indicating it has depleted its free chlorine, as the relative proportion of the insoluble inert may be building up, and 2) material that is effectively insoluble may ACCUMULATE IN THE POOL. ADDITIONALLY, SOME ADDITIVES SUCH AS GLYCOLURIL OR polytetrafluoroethylene are relatively expensive components to include in a TCCA formulation.

Selection of an inert ingredient that has a similar solubility to TCCA, as opposed to being mostly insoluble, should allow the overall tablet dissolution profile to remain the same. The highly oxidizing environment within a TCCA tablet limits the types of additives which are suitable for incorporation, limiting the possible compounds that are stable, relatively inexpensive, and having the desired solubility. Gypsum (e.g., calcium sulfate dihydrate) is widely used as a diluent or filler in a variety of industries, from food and pharmaceuticals to agriculture and construction. Its desirable properties in these industries are due to its low cost, lack of toxicity, chemical inertness, and in some cases its appearance as a white to off-white powder. These properties also make it attractive for formulating into a TCCA tablet, as well as its similar yet relative insolubility with respect to TCCA (0.2 g/100 mL for gypsum, 1.2 g/100 mL for TCCA).

Based on the findings reported herein, it was discovered that an inorganic salt (e.g., gypsum (calcium sulfate dihydrate)) may serve as an inert ingredient in the manufacture of TCCA-containing compositions because the addition of an inorganic salt (e.g., gypsum) does not adversely affect the dissolution rate of the composition. The compositions disclosed herein offer the potential for creating cost-efficient chlorinating tablets. The inclusion of an inorganic salt (e.g., gypsum) allows tablets to retain a familiar form-factor and keep the overall longevity of the tablet. Use of a low-cost inert tablet additive, such as an inorganic salt (e.g., gypsum), provides for a tablet with a reduced overall chlorine content and a similar dissolution time; the rate of introduction of chlorine from the tablet would differ from a similar tablet lacking an inorganic salt (e.g., gypsum).

DEFINITIONS

The phrase "a" or "an" entity as used herein refers to one or more of that entity. For example, an agent refers to one or more agents or at least one agent. As such, the terms "a" (or "an"), "one or more", and "at least one" can be used interchangeably herein. The use of the definite article ("the") to refer to "an entity" refers to one or more of that entity. For example, when the expression "the agent" refers to the previously recitation of "an agent" it is understood that the expression "the agent" refers to one or more agents.

The terms "optional" or "optionally" as used herein means that a subsequently described event or circumstance may but need not occur, and that the description includes instances where the event or circumstance occurs and instances in which it does not.

The expression "dissolution rate," as used herein refers to the absolute value of the slope of a linear relationship of the percent amount of undissolved tablet mass as a function of time, where the percent amount of undissolved tablet is equal to the ratio of the mass of undissolved tablet to the initial mass of tablet using a dissolution test as described herein.

The expression "inorganic salt," as used herein refers to an inorganic salt suitable for use in a recirculating water system having a solubility product constant ($K_{sp}$) at about 25° C. that ranges from about $1 \times 10^{-5}$ to about $1 \times 10^{-10}$.

The expression "gypsum," as used herein refers to calcium sulfate dihydrate ($CaSO_4 \cdot 2H_2O$).

The expression "Anhydrite," as used herein refers to calcium sulfate anhydrous ($CaSO_4$).

The expression "Alum," as used herein refers to the hydrated salt of aluminum sulfate, $Al_2(SO_4)_3 \cdot 14H_2O$.

The expression "Borax," as used herein refers to sodium tetraborate pentahydrate, $Na_2B_4O_7 \cdot 5H_2O$.

The expression "SHMP," as used herein refers to sodium hexametaphosphate, $(NaPO_3)_6$.

DETAILED DESCRIPTION

A first embodiment is directed to a composition for the treatment of a recirculating water system, comprising: trichloro-s-triazentrione (TCCA) in an amount of from about 75% to about 98% by mass of the composition; an inorganic salt present in an amount of from about 2% to about 25% by mass of the composition; and an auxiliary agent in a total amount of from about 0% to about 10% by mass of the composition.

Examples of a recirculating water system include, but are not limited to, a swimming pool, a jacuzzi, a spa, a splash pad, a water feature, a decorative fountain, an artificial pond, and the like; the recirculating water system may be treated or untreated.

In a first aspect of the first embodiment, the amount of TCCA is of from about 80% to about 98%, of from about 85% to about 98%, or of from about 90% to about 98% by mass of the composition. It is understood that "TCCA" refers to trichloro-s-triazenetrione having a purity of about 99%. The expressions TCCA and trichlor refer to trichloro-s-triazenetrione and are used interchangeably herein.

In a second aspect of the first embodiment, the amount of inorganic salt is of from about 2% to about 20%, of from about 2% to about 15%, or of from about 2% to about 10% by mass of the composition.

Inorganic salts described herein have a solubility product constant ($K_{sp}$) at about 25° C. that ranges from about $1 \times 10^{-5}$ to about $1 \times 10^{-10}$, including all ranges in between, e.g., about $1 \times 10^{-5}$ to about $1 \times 10^{-9}$, about $1 \times 10^{-5}$ to about $1 \times 10^{-8}$, about $1 \times 10^{-5}$ to about $1 \times 10^{-7}$, and about $1 \times 10^{-5}$ to about $1 \times 10^{-6}$.

Exemplary inorganic salts and their respective solubilities and/or $K_{sp}$-values are described in various treatises, e.g., the 85th Edition (2004) of the CRC Handbook of Chemistry and Physics, edited by Lide, D. R and the $14^{th}$ Edition of Lange's Handbook of Chemistry (1992) by J. A. Dean. Specific exemplary inorganic salts and their respective $K_{sp}$-values include, but are not limited to aluminum hydroxide ($Al(OH)_3$, $1.8 \times 10^{-5}$); calcium carbonate ($CaCO_3$, $3.4 \times 10^{-9}$); calcium hydrogen phosphate ($CaHPO_4$, $1 \times 10^{-7}$); calcium hydroxide ($Ca(OH)_2$, $5.5 \times 10^{-6}$); calcium sulfate anhydrous ($CaSO_4$ (Anhydrite), $4.9 \times 10^{-5}$); calcium sulfate hemihydrate ($CaSO_4 \cdot \frac{1}{2}H_2O$, $3.1 \times 10^{-7}$); calcium sulfate dihydrate ($CaSO_4 \cdot 2H_2O$ (gypsum), $3.1 \times 10^{-5}$); calcium sulfite ($CaSO_3$, $6.8 \times 10^{-8}$); calcium sulfite hemihydrate ($CaSO_3 \cdot \frac{1}{2}H_2O$, $3.1 \times 10^{-7}$); copper (I) bromide (CuBr, $6.3 \times 10^{-9}$); copper (I) chloride (CuCl, $1.7 \times 10^{-7}$); copper (II) iodate monohydrate ($Cu(IO_3)_2 \cdot H_2O$, $6.9 \times 10^{-8}$); copper(II) carbonate ($CuCO_3$, $1.4 \times 10^{10}$); iron (II) fluoride ($FeF_2$, $2.4 \times 10^{-6}$); magnesium carbonate ($MgCO_3$, $6.8 \times 10^{-6}$); magnesium carbonate pentahydrate ($MgCO_3 \cdot 5H_2O$, $3.8 \times 10^{-6}$); magnesium carbonate trihydrate ($MgCO_3 \cdot 3H_2O$, $2.4 \times 10^{-6}$); manganese (II) iodate ($Mn(IO_3)_2$, $4.4 \times 10^{-7}$); nickel (II) carbonate ($NiCO_3$, $1.4 \times 10^{-7}$); nickel (II) iodate ($Ni(IO_3)_2$, $4.7 \times 10^{-5}$); silver (I) iodate ($AgIO_3$, $3.2 \times 10^{-8}$); silver (I) sulfate ($Ag_2SO_4$, $1.2 \times 10^{-5}$); zinc carbonate ($ZnCO_3$, $1.5 \times 10^{-10}$); and zinc iodate dihydrate ($Zn(IO_3)_2 \cdot 2H_2O$, $4.1 \times 10^{-6}$).

In a third aspect of the first embodiment, the inorganic salt is selected from the group consisting of copper (I) chloride (CuCl), silver (I) sulfate ($Ag_2SO_4$), Anhydrite ($CaSO_4$), gypsum ($CaSO_4.2H_2O$), aluminum hydroxide ($Al(OH)_3$), calcium carbonate ($CaCO_3$), calcium hydrogen phosphate ($CaHPO_4$), calcium hydroxide ($Ca(OH)_2$), calcium sulfite ($CaSO_3$), calcium sulfite hemihydrate ($CaSO_3.0.5H_2O$), copper (I) bromide (CuBr), copper(II) carbonate ($CuCO_3$), copper (II) iodate monohydrate ($Cu(IO_3)_2 \cdot H_2O$), iron (II) fluoride ($FeF_2$), magnesium carbonate ($MgCO_3$), magnesium carbonate trihydrate ($MgCO_3 \cdot 3H_2O$), magnesium carbonate pentahydrate ($MgCO_3 \cdot 5H_2O$), manganese (II) iodate ($Mn(IO_3)_2$), nickel (II) carbonate ($NiCO_3$), nickel (II) iodate ($Ni(IO_3)_2$), silver (I) iodate ($AgIO_3$), zinc carbonate ($ZnCO_3$), zinc iodate dihydrate ($Zn(IO_3)_2 \cdot 2H_2O$), and a combination thereof.

In a fourth aspect of the first embodiment, the inorganic salt is selected from the group consisting of copper (I) chloride (CuCl), silver (I) sulfate ($Ag_2SO_4$), Anhydrite ($CaSO_4$), gypsum ($CaSO_4.2H_2O$), and a combination thereof.

In a fifth aspect of the first embodiment, the inorganic salt is gypsum ($CaSO_4.2H_2O$).

In a sixth aspect, the inorganic salt is gypsum and the amount of gypsum is of from about 2% to about 20%, of from about 2% to about 15%, or of from about 2% to about 10% by mass of the composition.

In a seventh aspect of the first embodiment, the inorganic salt is gypsum and the amount of gypsum is of from about 2% to about 15% by mass of the composition.

In an eighth aspect of the first embodiment, the inorganic salt is gypsum and the amount of gypsum is of from about 2% to about 10% by mass of the composition.

In a ninth aspect of the first embodiment, the auxiliary agent is present in amount of from about 0.1 to about 10%, of from about 1% to about 10%, or of from about 1% to about 5% by mass of the composition.

In a tenth aspect of the first embodiment, the auxiliary agent is selected from the group consisting of a processing aid, a clarifier, a water softener, a dye, a fragrance, an enzyme, a pH modifier, a sanitizer, an algaecide, and a combination thereof.

In an eleventh aspect of the first embodiment, the auxiliary agent includes, but not limited to, Alum, Borax, Boric Acid, $MgSO_4 \cdot 7H_2O$, $Na_2SO_4$, ultramarine blue (CI Pigment Blue 29), SHMP, an algaecide (e.g., copper sulfate), and a combination thereof.

As stated above, "Alum" refers to the hydrated salt of aluminum sulfate, $Al_2(SO_4)_3 \cdot 14H_2O$. Alum is the most commonly used form of aluminum sulfate for water treatment. Other hydration states of aluminum sulfate, such as the anhydrous or 18-hydrate forms, and double sulfate salts, such as potassium aluminum sulfate, would be expected to perform similarly.

Also as stated above, "Borax" refers to sodium tetraborate pentahydrate, $Na_2B_4O_7 \cdot 5H_2O$. Borax is the most commonly used form of sodium tetraborate for water treatment. However, other hydration states of sodium tetraborate, such as the anhydrous form or decahydrate, as well as other borate salts, would be expected to perform similarly.

A second embodiment relates to a formed object that comprises any one of the compositions of the first embodiment (e.g., any one of the compositions of the first to eleventh aspects).

In a first aspect of the second embodiment, the formed object is selected from the group consisting of a cylindrical formed object, a prismatic formed object, a rectangular block, a ring, and a sphere. It is understood that formed objects identified by certain Euclidean shapes are not meant to be strictly limited to said Euclidean shapes. For instance, a cylindrical formed object may include a beveled edge or may include an elevated face, and thus, a cylindrical formed object is understood to be substantially cylindrical.

In a second aspect of the second embodiment, the formed object is a tablet or stick.

In a third aspect of the second embodiment, the formed object is a multi-layered tablet or multi-layered stick.

The mass of the formed object ranges from about 14 g (about 0.5 oz.) to about 454 g (about 16 oz.), and all values there between, including, for example, about 20 g (about 0.7 oz.), about 170 g (about 6 oz.), about 225 g (about 8 oz.), and about 284 g (about 10 oz.).

Exemplary tablets (or pucks) include, but are not limited to: (i) a tablet having a mass of about 225 g (about 8 oz.), a height of about 2.54 cm (about 1"), and a diameter of about 7.62 cm (about 3"); (ii) a tablet having a mass of about 20 g (about 0.7 oz.), a height of about 1.9 cm (about ¾"), and a diameter of about 2.54 cm (about 1"); and (iii) a tablet having a mass of about 170 g (about 6 oz.), a height of about 1.9 cm (about ¾"), and a diameter of about 7.62 cm (about 3"). Exemplary tablets generally have a break strength of about 0.9 kN (about 200 lbs.) to about 1.1 kN (about 250 lbs.) of force.

Exemplary sticks include, but are not limited to a stick having a mass of about 225 g (about 8 oz.), a height of about 7.62 cm (about 3"), and a diameter of about 5.1 cm (about 2"). Other example sticks may have masses of about 170 g (about 6 oz.) or about 284 g (about 10 oz.) having cylindrical or prismatic shapes.

A discovery of a formed object relates to the observation that a formed object described herein has a dissolution rate that is substantially the same as a dissolution rate of a test formed object comprising TCCA in an amount of about 100% by mass of the test formed object.

Accordingly, a fourth aspect of the second embodiment aspect relates to any one of the formed objects described herein having a dissolution rate that is substantially the same as a dissolution rate of a test formed object comprising TCCA in an amount of about 100% by mass of the test formed object. It is understood that if the formed object is in the form of a tablet of a certain size, then the test formed object is also in the form of a tablet of the same size.

The dissolution rate (DR) of the formed object (e.g., tablet) refers to the absolute value of the slope of a linear relationship of the percent amount of undissolved tablet mass as a function of time, where the percent amount of undissolved tablet is equal to the ratio of the mass of undissolved tablet to the initial mass of tablet using a dissolution test.

The dissolution test refers to a test where a formed object (e.g., a tablet having a mass of about 225 g (about 8 oz.), height of about 2.54 cm (about 1"), and diameter of about 7.62 cm (about 3")) is placed in a skimmer of a balanced pool, using a flow rate of 35 gpm and 12 h on/off pump cycle). The mass of the formed object (e.g., the tablet) was measured periodically (e.g., initially, day 1, day 2, day 3, and day 4) and recorded. The residual tablet, optionally, may be rotated after each mass measurement.

A test formed object (e.g., a tablet) comprising TCCA in an amount of about 100% by mass of the test formed object was used as a comparison. In a separate dissolution test, the mass of the test formed object (e.g., a TCCA-only tablet having a mass of about 225 g (about 8 oz.), height of about 2.54 cm (about 1"), and diameter of about 7.62 cm (about 3")) was measured periodically (e.g., initially, day 1, day 2, day 3, and day 4) and recorded.

A fifth aspect of the second embodiment relates to any one of the formed objects described herein having a dissolution rate that is from about 70 to about 130%, from about 80 to about 120%, from about 90 to about 110%, the dissolution rate from about 95 to about 105% as a dissolution rate of a test formed object comprising TCCA in an amount of about 100% by mass of the test formed object.

The observation that a formed object described herein has a dissolution rate that is substantially the same as a dissolution rate of a test formed object comprising TCCA in an amount of about 100% by mass of the test formed object is surprising and unexpected.

A third embodiment is directed to a process for preparing any one of the formed objects described herein, said process comprises: blending the TCCA, the inorganic salt, and the auxiliary agent to obtained a blended mixture; and compressing the blended mixture to obtain the formed object.

It is understood that any suitable method may be used to blend the TCCA, the inorganic salt, and the auxiliary agent to obtain the blended mixture. Any suitable blender may be used for the proper mixing of TCCA, the inorganic salt (e.g., gypsum), and any additional auxiliary agents. Different blender types providing adequate preparation mixing include, but are not limited to, batch or continuous blenders such as twin-shell V-blenders, twin-shelled cross-flow blenders, screw blenders, and screw conveyer flow blenders.

It is understood that any suitable method may be used to compress the blended mixture. As related to a formed object in the form of a tablet, it is understood that compression into tablets may be accomplished with any suitable tableting press capable of manufacturing tablets. Acceptable press types include, but are not limited to hydraulic, mechanical and rotary presses.

A fourth embodiment is directed to a method for treating a recirculating water system, which comprises: adding any one of the formed objects described herein to the water of the recirculating water system.

Common methods for adding a formed object (e.g., a tablet or a stick) to a recirculating water system are through a skimmer, a feeder, and/or a floater.

The skimmer application refers to placing the formed object (e.g., the tablet or stick) directly in the flow path of a recirculating system in the body of water.

The feeder application refers to placing a formed object (e.g., a tablet or a stick) in a separate container, whereupon the solids dissolve to generate a concentrated solution which can be metered into the recirculating water system body.

The floater application refers to placing the formed object (e.g., tablet or stick) directly to the recirculating water system, typically through the use of a container which allows for passive diffusion to the water of the recirculating water system.

It may be understood from the embodiments described herein that the "comprising" expression may be replaced, where appropriate, by the "consisting of" expression.

In that regard, a fifth embodiment is directed to a composition for the treatment of a recirculating water system, consisting of: trichloro-s-triazentrione (TCCA) in an amount of from about 75% to about 98% by mass of the composition; an inorganic salt present in an amount of from about 2% to about 25% by mass of the composition; and an auxiliary agent in a total amount of from about 0% to about 10% by mass of the composition.

The fifth embodiment also includes the same aspects (e.g., first through eleventh) as the first embodiment.

Further, the second, third, and fourth embodiments that depend from the first embodiment are equally applicable to the fifth embodiment. For instance, a sixth embodiment relates to a formed object that comprises any one of the compositions of the fifth embodiment (e.g., any one of the compositions of the first to eleventh aspects of the fifth embodiment). Aspects of the sixth embodiment include any one of the aspects of the second embodiment. For example, in a first aspect of the sixth embodiment, the formed object is selected from the group consisting of a cylindrical formed object, a prismatic formed object, a rectangular block, a ring, and a sphere.

EXAMPLES

The embodiments described herein will next be described in more detail by way of examples, which should not be construed to limit the subject matter claimed herein.

Example 1

A model tablet consisting of trichloro-s-triazinetrione (trichloroisocyanuric acid or TCCA) (90.9%) blended boric acid (1%) as a processing aid was blended with 8.1% of a variety of inorganic salts for screening as a low-cost diluent. These were compared against a tablet consisting of 99% TCCA with 1% boric acid. In each case, a tablet with a mass of about 228 g was prepared from a blend of the appropriate composition of TCCA, boric acid, and diluent. Each was tumble blended for a minimum of 20 minutes, then compressed into a tablet with 3" diameter using a hydraulic press at 55,000 lbs of force. The diluents tested at a composition of 8.1% of the tablet included hydrated aluminum sulfate (Alum), magnesium sulfate heptahydrate ($MgSO_4.7H_2O$), anhydrous sodium sulfate ($Na_2SO_4$), and calcium sulfate dihydrate (gypsum).

The tablets were placed in a skimmer basket in a balanced pool (e.g. 120-150 ppm total alkalinity, 200-250 ppm calcium hardness, pH 7.2-7.6), with a continuous flow rate of 30-35 gpm. The tablets were weighed in intervals and the dissolution is summarized in Table 1.

TABLE 1

| 99% TCCA | | Alum | | Sodium Sulfate | | Magnesium Sulfate | | Gypsum | |
|---|---|---|---|---|---|---|---|---|---|
| t, h | W, g | t, h | W, g | t, h | W, g | t, h | W, g | t, h | W, g |
| 0.0 | 227.7 | 0.0 | 227.8 | 0.0 | 226.1 | 0.0 | 227.3 | 0.0 | 227.5 |
| 2.0 | 228.4 | 3.2 | 212.2 | 2.4 | 222.6 | 2.0 | 217.8 | 2.0 | 227.6 |
| 5.3 | 204.2 | 6.2 | 183.1 | 4.4 | 209.6 | 5.3 | 180.6 | 4.5 | 208.4 |
| 7.3 | 185.9 | 22.7 | 21.7 | 7.4 | 190.1 | 7.3 | 151.0 | 7.8 | 181.0 |
| 23.5 | 71.2 | 30.4 | 1.7 | 23.2 | 58.8 | 23.5 | 0.0 | 23.8 | 74.7 |
| 27.5 | 57.7 | 46.7 | 0.0 | 27.4 | 25.6 | 27.5 | 0.0 | 27.8 | 53.9 |
| 31.3 | 45.1 | 54.2 | 0.0 | 30.9 | 7.0 | 31.3 | 0.0 | 32.0 | 38.2 |
| 47.3 | 11.1 | 70.2 | 0.0 | 47.0 | 0.0 | 47.3 | 0.0 | 48.0 | 2.8 |
| 54.5 | 2.4 | | | 55.4 | 0.0 | 54.5 | 0.0 | 56.0 | 0.0 |

This data shows that only gypsum was able to be incorporated in this manner without leading to an increase in the rate of dissolution of the tablet.

Example 2

A screen of additional tablet diluents and use levels were also explored (see Table 2a). As with Example 1, the tablets were prepared from blends of 99% TCCA with appropriate diluent(s) and pressed to generate about 228 g, 3" tablets. These dissolution studies were conducted in balanced pool water, and utilized a 12 h on/off pump run cycle, which is more consistent with typical consumer equipment.

TABLE 2a

| Compositional makeup for Compositions 2A-2J | | | | | | | | | | |
|---|---|---|---|---|---|---|---|---|---|---|
| | 2A | 2B | 2C | 2D | 2E | 2F | 2G | 2H | 2I | 2J |
| TCCA | 100.0 | 90.0 | 90.0 | 90.0 | 90.0 | 90.0 | 90.0 | 92.7 | 89.0 | 86.0 |
| Alum | — | — | 5.0 | 10.0 | — | — | — | — | — | — |
| Gypsum | — | — | — | — | — | — | — | 8.3 | 11.0 | 14.0 |
| Borax | — | — | 5.0 | — | 10.0 | — | — | — | — | — |

TABLE 2a-continued

Compositional makeup for Compositions 2A-2J

| | 2A | 2B | 2C | 2D | 2E | 2F | 2G | 2H | 2I | 2J |
|---|---|---|---|---|---|---|---|---|---|---|
| $Na_2SO_4$ | — | 10.0 | — | — | — | — | — | — | — | — |
| SHMP | — | — | — | — | — | 10.0 | — | — | — | — |
| $MgSO_4 \cdot 7H_2O$ | — | — | — | — | — | — | 10.0 | — | — | — |

TABLE 2b

Dissolution Test Results of the Compositions 2A-2J

| Mass (g) | 2A | 2B | 2C | 2D | 2E | 2F | 2G | 2H | 2I | 2J |
|---|---|---|---|---|---|---|---|---|---|---|
| Initial | 224.74 | 224.56 | 224.37 | 224.65 | 224.58 | 224.85 | 224.23 | 224.64 | 225.38 | 231.65 |
| After Wetting | 235.18 | 236.07 | 229.29 | 234.25 | 234.65 | 235.92 | 235.89 | 235.41 | 236.64 | 243.21 |
| Day 1 | 156.79 | 4.05 | 27.10 | 103.43 | 20.13 | 65.44 | 60.46 | 141.16 | 126.25 | 115.49 |
| Day 2 | 91.32 | 0.00 | 0.00 | 6.97 | 0.00 | 0.00 | 0.00 | 67.37 | 72.23 | 62.35 |
| Day 3 | 40.49 | — | — | 0.00 | — | — | — | 19.34 | 20.86 | 18.67 |
| Day 4 | 9.74 | — | — | — | — | — | — | 2.62 | — | — |
| DR ($d^{-1}$) | 25.9 | 98.2 | 87.9 | 49.6 | 91.0 | 70.9 | 73.0 | 28.2 | 32.9 | 33.7 |
| DR Ratio | 1.0 | 3.8 | 3.4 | 1.9 | 3.5 | 2.7 | 2.8 | 1.1 | 1.2 | 1.3 |

Table 2b shows the mass (M) amounts (in grams) of the tablet compositions initially (Mo), after wetting (Mw), and as a function of time (Mt). A plot of the percent amount of undissolved tablet (i.e., (Mt/Mo)×100)) versus time, not including Mw, afforded a generally linear ($R^2 \geq 0.92$) relationship regardless of whether the intercept was variable or set to 100. For consistency, linear relationships were determined where the intercept was set to 100. The plots afforded lines having a negative slope. The dissolution rate ("DR" in reciprocal days ($d^{-1}$)), as used herein, is the negative slope (i.e., absolute value of the slope) of the plot of percent amount of undissolved tablet versus time. The DR ratio is the ratio of the DR for each of compositions 2B-2J to the DR of composition 2A, which by definition has a DR of 1.

The Table 2b data show that replacement of 10% of the TCCA in the tablets with sodium sulfate (2B), aluminum sulfate (2D), magnesium sulfate, sodium tetraborate (borax, 2E), and sodium hexametaphosphate (SHMP, 2F) all led to tablets having DR-values that exceeded the DR-value for composition 2A by at least 90%, and thus, these tablets had completely dissolved by the $3^{rd}$ or $4^{th}$ days.

The Table 2b data also show that a blend of Alum and Borax (2C), also accelerated the tablet dissolution rate, even though a blend of Alum and Borax would have been expected to neutralize any effect on dissolution rate driven by local pH changes.

Finally, the Table 2b data show that replacing trichlor with gypsum, demonstrated here at use levels of 8.3% (2H), 11% (2I), and 14% (2J), all led to tablets with substantially the same dissolution rate of the test composition (i.e., 100% TCCA tablet).

Example 3

Formulated water treatment tablets may contain a small percentage of components that confer other benefits to the water, such as Alum as a clarifier or SHMP as a water softener. Including gypsum as a component along with TCCA and keeping the third component at the low use levels consistent with typical formulated water treatment tablets (e.g., ≤10% or ≤5%) once again led to tablets where the overall tablet dissolution time was comparable to a 100% TCCA tablet.

Table 3a summarizes the compositional makeup of the tablet compositions, while Table 3b summarizes the observed dissolution properties of said tablet compositions. These were conducted in a skimmer in balanced pool water, and utilized a 12 h on/off pump run cycle.

TABLE 3a

Compositional makeup for Compositions 3A-3I

| | 3A | 3B | 3C | 3D | 3E | 3F | 3G | 3H | 3I |
|---|---|---|---|---|---|---|---|---|---|
| TCCA | 100.0 | 95.0 | 90.0 | 90.0 | 92.7 | 92.7 | 92.7 | 92.7 | 92.7 |
| Aluminum sulfate | — | — | — | 3.8 | 2.9 | 4.4 | — | — | — |
| Orco Blue | — | 0.2 | — | — | — | — | — | — | — |
| Gypsum | — | 3.8 | 6.2 | 6.2 | 4.4 | 2.9 | 4.4 | 2.9 | 4.4 |
| Boric Acid | — | 1.0 | — | — | — | — | — | — | — |
| $Na_2SO_4$ | — | — | — | — | — | — | — | — | — |
| SHMP | — | — | 3.8 | — | — | — | 2.9 | 4.4 | — |
| $MgSO_4 \cdot 7H_2O$ | — | — | — | — | — | — | — | — | 2.9 |

TABLE 3b

Dissolution Test Results of the Compositions 3A-3I

| Mass | 3A | 3B | 3C | 3D | 3E | 3F | 3G | 3H | 3I |
|---|---|---|---|---|---|---|---|---|---|
| Initial | 224.74 | 223.96 | 224.63 | 224.84 | 233.95 | 224.45 | 224.77 | 224.53 | 224.86 |
| After Wetting | 235.18 | 235.22 | 229.30 | 231.42 | 234.10 | 234.17 | 233.40 | 233.80 | 234.64 |
| Day 1 | 156.79 | 151.96 | 156.88 | 148.01 | 181.59 | 182.09 | 190.70 | 184.22 | 177.36 |
| Day 2 | 91.32 | 89.06 | 69.42 | 74.66 | 144.26 | 143.09 | 119.56 | 120.85 | 108.91 |
| Day 3 | 40.49 | 35.84 | 15.27 | 19.95 | 97.03 | 82.10 | 75.01 | 78.02 | 71.27 |
| Day 4 | 9.74 | 6.02 | 2.52 | 0.00 | 64.56 | 64.05 | 33.89 | 40.42 | 40.39 |
| DR ($d^{-1}$) | 25.9 | 26.5 | 28.1 | 31.5 | 18.8 | 18.9 | 21.6 | 21.1 | 21.9 |
| DR Ratio | 1 | 1 | 1.1 | 1.2 | 0.7 | 0.7 | 0.8 | 0.8 | 0.8 |

The Table 3b data show that all gypsum-containing compositions have DR-values that are substantially the same as the tablet composition containing only TCCA.

Example 4

The ability of gypsum to dilute trichlor without negatively impacting the dissolution time can be extended. Tablets with a mass of about 228 g were prepared from a blend of the appropriate composition of TCCA and gypsum, with an amount of boric acid (1%) constant across all blends. Each composition was tumble blended for a minimum of 20 minutes, then compressed into a tablet with 3" diameter using a hydraulic press at 55,000 lbs of force. Tablets with compositions of 90% trichlor/9% gypsum (4A), 80% trichlor/19% gypsum (4B1/4B2), and 75% trichlor/24% gypsum (4D) show no significant difference in dissolution profile when placed in a skimmer in a balanced pool, using a flow rate of 35 gpm and 12 h on/off pump cycle.

TABLE 4

Dissolution Test Results of the Compositions 4A-4D

| Day | 4A<br>90% TCCA/<br>9% Gypsum | 4B1<br>80% TCCA/<br>19% Gypsum | 4B2<br>80% TCCA/<br>19% Gypsum | 4D<br>75% TCCA/<br>24% Gypsum |
|---|---|---|---|---|
| Initial Mass | 228 | 228.4 | 227.9 | 227.9 |
| 1 | 154 | 151 | 157 | 154 |
| 2 | 50 | 43.1 | 48.4 | 52.3 |
| 3 | 12 | 11.4 | 10.8 | 16.2 |
| 4 | 0 | 0 | 0 | 0 |
| DR ($d^{-1}$) | 33.8 | 34.4 | 33.9 | 33.2 |
| DR Ratio | 1.3 | 1.3 | 1.3 | 1.3 |

The Table 4 data show that all gypsum-containing compositions have DR-values that are substantially the same as the tablet composition containing only TCCA.

While the examples to this point focused on the use of gypsum, Example 5 demonstrates that other relatively insoluble inorganic salts may be used as well.

Example 5

A series of model tablets consisting of trichloro-s-triazinetrione (trichloroisocyanuric acid or TCCA) (90%), boric acid (1%) as a processing aid, and 9% of a series of selected inorganic salts were prepared. These include copper (I) chloride (CuCl), Anhydrite (CaSO$_4$, anhydrous calcium sulfate), silver (I) sulfate (Ag$_2$SO$_4$), and gypsum (CaSO$_4$.2H$_2$O). These inorganic salts were chosen due to their similar solubility product constants ($K_{sp}$) to that of gypsum. Each was compressed into a tablet with a mass of about 20 grams and a 1" diameter using a hydraulic press at about 44.5 kN (about 10,000 lbs.) of force. The tablets were placed in a skimmer basket mounted to the side of a balanced pool. There was minimal flow at the site, and the tablets were weighed in intervals and their positions were rotated daily. The dissolution data are summarized in Table 5.

TABLE 5

Dissolution Results for additional inorganic salts

| Time, h | TCCA<br>Mass, g | CuCl<br>Mass, g | Ag$_2$SO$_4$<br>Mass, g | Anhydrite<br>Mass, g | Gypsum<br>Mass, g |
|---|---|---|---|---|---|
| Initial mass | 19.9 | 19.7 | 19.9 | 20 | 19.9 |
| 1.1 | 20.3 | 19.8 | 20.3 | 20.9 | 20.7 |
| 2.1 | 20 | 19.3 | 20 | 20.5 | 20.5 |
| 4.2 | 19.5 | 18.3 | 19.2 | 19.4 | 19.6 |
| 5.9 | 18.9 | 17.4 | 18.5 | 18.6 | 18.9 |
| 21.3 | 14.8 | 12.6 | 13.2 | 13.7 | 15 |
| 24.3 | 14.1 | 11.5 | 12.3 | 12.7 | 14.1 |
| 29.2 | 12.5 | 9.9 | 11.2 | 11.5 | 12.5 |
| 47.4 | 7.5 | 5.8 | 7.8 | 8.3 | 7.9 |
| 53.7 | 6.5 | 4.7 | 6.5 | 6.9 | 6.9 |
| 70.6 | 4.4 | 2.4 | 3.8 | 4.4 | 4.7 |
| 77.8 | 3.3 | 1.7 | 3.1 | 3.5 | 3.8 |
| DR ($h^{-1}$) | 1.16 | 1.25 | 1.16 | 1.14 | 1.15 |
| DR Ratio | 1.0 | 1.1 | 1.0 | 1.0 | 1.0 |

The data plainly shows that each of the compositions provided a Dissolution Rate ratio substantially the same as the TCCA only tablet. As a point of reference, the $K_{sp}$-values for each inorganic salt are: Copper (I) chloride (CuCl, $1.7 \times 10^{-7}$), silver sulfate (Ag$_2$SO$_4$, $1.2 \times 10^{-5}$), Anhydrite (CaSO$_4$, $4.9 \times 10^{-5}$), and Gypsum (CaSO$_4$·2H$_2$O, $3.1 \times 10^{-5}$).

The inclusion of an inorganic salt (e.g., gypsum) as a tablet diluent had a surprisingly small effect on the overall tablet dissolution time. Several other diluents were included at the same use level, including similar inorganic sulfate salts such as aluminum sulfate, magnesium sulfate, or sodium sulfate. In each case, the greater solubility of the other diluents led to an effective increase in the surface area of the TCCA in the tablet, which led to an overall increase in the rate of tablet dissolution. Certain inorganic salts (e.g., gypsum) were unique among the materials tested in having little to no impact on the dissolution rate, presumably due to its lower solubility. However, solubility alone does not completely predict this effect. An inorganic salt (e.g., gypsum) tableted without being blended with trichlor leads to a tablet that rapidly disintegrates, as water disrupts the weak interaction between particulates of the inorganic salt (e.g., gypsum). Thus, it is an unexpected finding was that the compressed blend of trichlor and gypsum led to the observed effect. In short, gypsum did not seem to have strong cohesion properties upon tableting. That is, undissolved gypsum did not seem to provide a framework or scaffold for supporting trichlor, nor did it overly impede water access to trichlor on the surface of the tablet. These two factors allow the blended trichlor and gypsum to preserve the surface-area driven erosion of a conventional trichlor tablet while moderating the actual amount of trichlor delivered into the water.

The subject matter of U.S. Provisional Patent Application No. 62/890,650, filed on Aug. 23, 2019 is hereby incorporated by reference in its entirety.

Information disclosed in the references cited herein is incorporated by reference in its entirety. In the event that information incorporated by reference conflicts with the meaning of a term or an expression disclosed herein, the meaning of the term or the expression disclosed herein controls.

The invention claimed is:

1. A composition for the treatment of a recirculating water system, consisting of:
   trichloro-s-triazinetrione (TCCA) in an amount of from about 75% to about 98% by mass of the composition;
   an inorganic salt present in an amount of from about 2% to about 25% by mass of the composition; and
   an auxiliary agent in a total amount of from about 0% to about 10% by mass of the composition;
   wherein the auxiliary agent is selected from the group consisting of aluminum sulfate tetradecahydrate, sodium tetraborate pentahydrate, boric acid, magnesium sulfate heptahydrate, sodium sulfate, a blue dye, sodium hexametaphosphate, copper sulfate, and a combination thereof.

2. The composition of claim 1, wherein the amount of TCCA is of from about 80% to about 98% by mass of the composition.

3. The composition of claim 1, wherein the amount of inorganic salt is of from about 2% to about 20% by mass of the composition.

4. The composition of claim 1, wherein the inorganic salt is selected from the group consisting of copper (I) chloride (CuCl), silver (I) sulfate ($Ag_2SO_4$), calcium sulfate anhydrous ($CaSO_4$), gypsum ($CaSO_4 \cdot 2H_2O$), aluminum hydroxide ($Al(OH)_3$), calcium carbonate ($CaCO_3$), calcium hydrogen phosphate ($CaHPO_4$), calcium hydroxide ($Ca(OH)_2$), calcium sulfite ($CaSO_3$), calcium sulfite hemihydrate ($CaSO_3 \cdot 0.5H_2O$), copper (I) bromide (CuBr), copper (II) carbonate ($CuCO_3$), copper (II) iodate monohydrate ($Cu(IO_3)_2 \cdot H_2O$), iron (II) fluoride ($FeF_2$), magnesium carbonate ($MgCO_3$), magnesium carbonate trihydrate ($MgCO_3 \cdot 3H_2O$), magnesium carbonate pentahydrate ($MgCO_3 \cdot 5H_2O$), manganese (II) iodate ($Mn(IO_3)_2$), nickel (II) carbonate ($NiCO_3$), nickel (II) iodate ($Ni(IO_3)_2$), silver (I) iodate ($AgIO_3$), zinc carbonate ($ZnCO_3$), zinc iodate dihydrate ($Zn(IO_3)2 \cdot 2H_2O$), and combinations thereof.

5. The composition of claim 1, wherein the inorganic salt is selected from the group consisting of copper (I) chloride (CuCl), silver (I) sulfate ($Ag_2SO_4$), calcium sulfate anhydrous ($CaSO_4$), gypsum ($CaSO_4 \cdot 2H_2O$), and combinations thereof.

6. The composition of claim 1, wherein the inorganic salt is gypsum.

7. The composition of claim 1, wherein the amount of gypsum is of from about 2% to about 20% by mass of the composition.

8. The composition of claim 1, wherein the inorganic salt is gypsum and the amount of gypsum is of from about 2% to about 15% by mass of the composition.

9. The composition of claim 1, wherein the inorganic salt is gypsum and the amount of gypsum is of from about 2% to about 10% by mass of the composition.

10. A formed object comprising the composition of claim 1, wherein the formed object is selected from the group consisting of a cylindrical formed object, a prismatic formed object, a rectangular block, a ring, and a sphere.

11. The formed object of claim 10 having a mass of about 14 g to about 454 g.

12. A tablet comprising the composition of claim 1, wherein the tablet (i) has a mass of about 225 g, a height of about 2.54 cm, and a diameter of about 7.62 cm; (ii) has a mass of about 20 g, a height of about 1.9 cm, and a diameter of about 2.54 cm; or (iii) has a mass of about 170 g, a height of about 1.9 cm, and a diameter of about 7.62 cm.

13. A stick comprising the composition of claim 1, wherein the stick has a mass of about 225 g, a height of about 7.62 cm, and a diameter of about 5.1 cm.

14. A multi-layered tablet or multi-layered stick comprising the composition of claim 1.

15. The formed object of claim 10, wherein the formed object has a dissolution rate that is substantially the same as a dissolution rate of a test composition comprising TCCA in an amount of about 100% by mass of the test composition.

16. The formed object of claim 10, wherein the formed object has a dissolution rate that is from about 70% to about 130% of a dissolution rate of a test formed object comprising TCCA in an amount of about 100% by mass of the test formed object.

17. A process for preparing the formed object of claim 10, which comprises:
   blending the TCCA, the inorganic salt, and the auxiliary agent to obtain a blended mixture; and
   compressing the blended mixture to obtain the formed object.

18. A method for treating a recirculating water system, which comprises: adding the formed object of claim 10 to the water of the recirculating water system.

19. The method of claim 18, wherein the recirculating water system selected from the group consisting of a swimming pool, a jacuzzi, a spa, a splash pad, a water feature, a decorative fountain, and an artificial pond.

20. The method of claim 18, wherein the recirculating water system is a swimming pool.

* * * * *